United States Patent
Qian

(10) Patent No.: US 10,372,862 B2
(45) Date of Patent: Aug. 6, 2019

(54) SYSTEMS AND METHODS FOR LAYOUT OBJECTS SELECTION AND REPLICATION VIA A GRAPHIC-BASED LAYOUT EDITOR

(71) Applicant: SKILLCAD, INC., San Jose, CA (US)

(72) Inventor: Pengwei Qian, San Jose, CA (US)

(73) Assignee: Skillcad, Inc., San Jose, CA (US)

( * ) Notice: Subject to any disclaimer, the term of this patent is extended or adjusted under 35 U.S.C. 154(b) by 207 days.

(21) Appl. No.: 15/589,935

(22) Filed: May 8, 2017

(65) Prior Publication Data
US 2018/0321824 A1  Nov. 8, 2018

(51) Int. Cl.
G06F 17/50 (2006.01)
G06T 11/60 (2006.01)

(52) U.S. Cl.
CPC .......... *G06F 17/5072* (2013.01); *G06T 11/60* (2013.01); *G06F 2217/06* (2013.01)

(58) Field of Classification Search
CPC ... G06F 17/5072; G06F 2217/06; G06T 11/60
See application file for complete search history.

(56) References Cited

U.S. PATENT DOCUMENTS

| 6,351,841 B1* | 2/2002 | Tickle ................. G06F 17/5068 716/52 |
| 2006/0225005 A1* | 10/2006 | Correale, Jr. ....... G06F 17/5068 716/113 |
| 2010/0037197 A1* | 2/2010 | Fukunaga ........... G06F 17/5068 716/126 |
| 2012/0227023 A1* | 9/2012 | Bendicksen ........ G06F 17/5081 716/112 |

* cited by examiner

*Primary Examiner* — Vuthe Siek

(57) ABSTRACT

A new approach is proposed to support layout objects selection and replication via a graphic-based layout editing tool running on a host. Specifically, the graphic-based layout editing tool presents a plurality of layout objects in a layout on a display of the host and enables a user to directionally and continuously move a cursor across the layout along a single line, wherein the single line intersects with and selects a starting group of one or more layout objects. The graphic-based layout editing tool then retrieves metadata and/or design rules associated with the starting group selected layout objects and to create an expanded group of layout objects by replicating and including one or more of the layout objects in the starting group selected layout objects. The graphic-based layout editing tool then presents the expanded group of layout objects on the display following the layout objects replication operation.

18 Claims, 11 Drawing Sheets

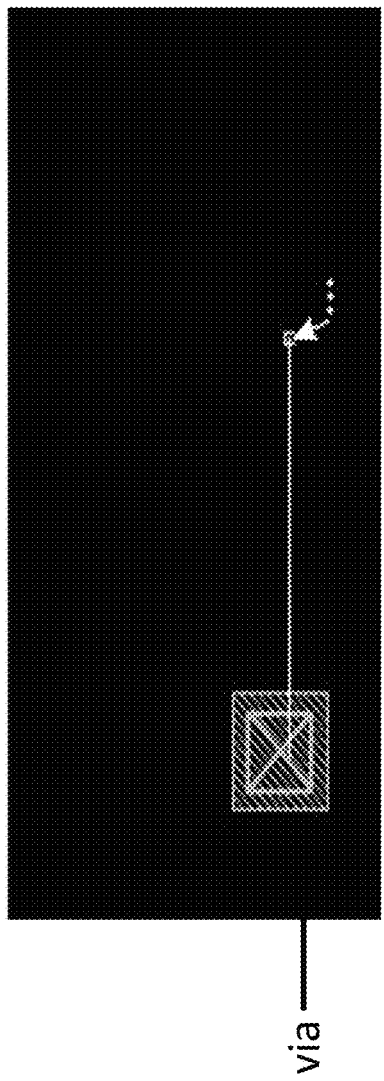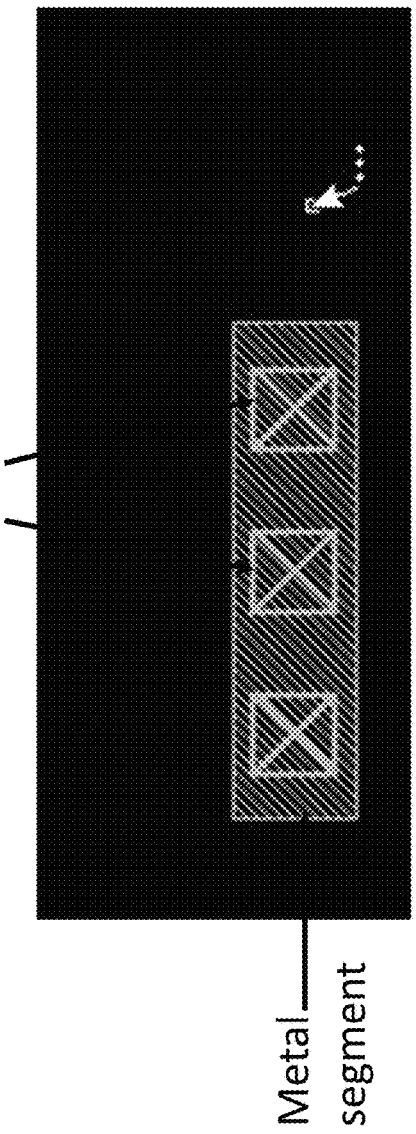
FIG. 4A
FIG. 4B

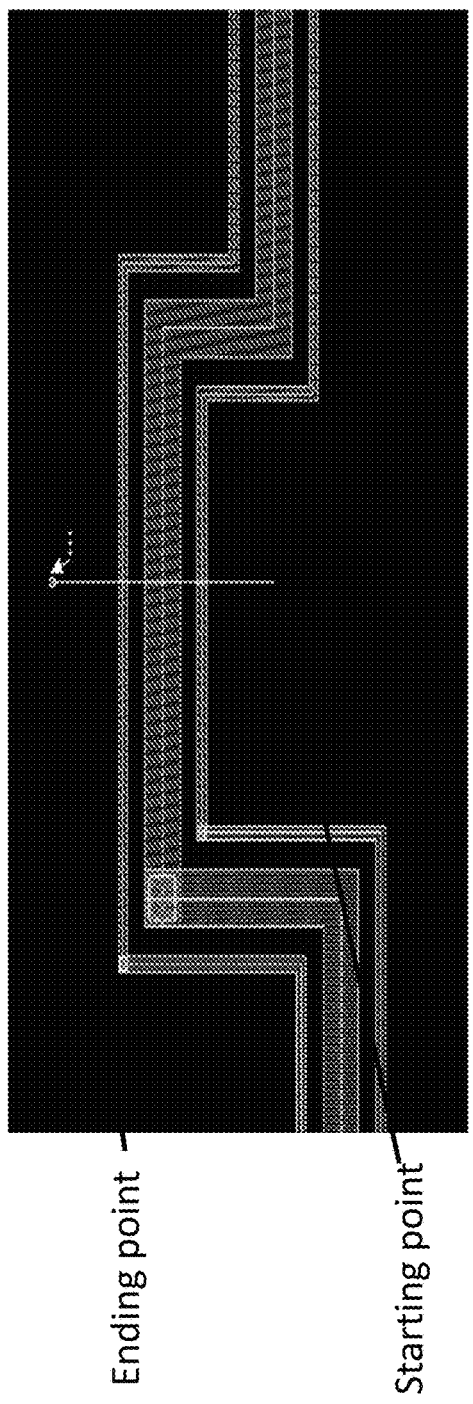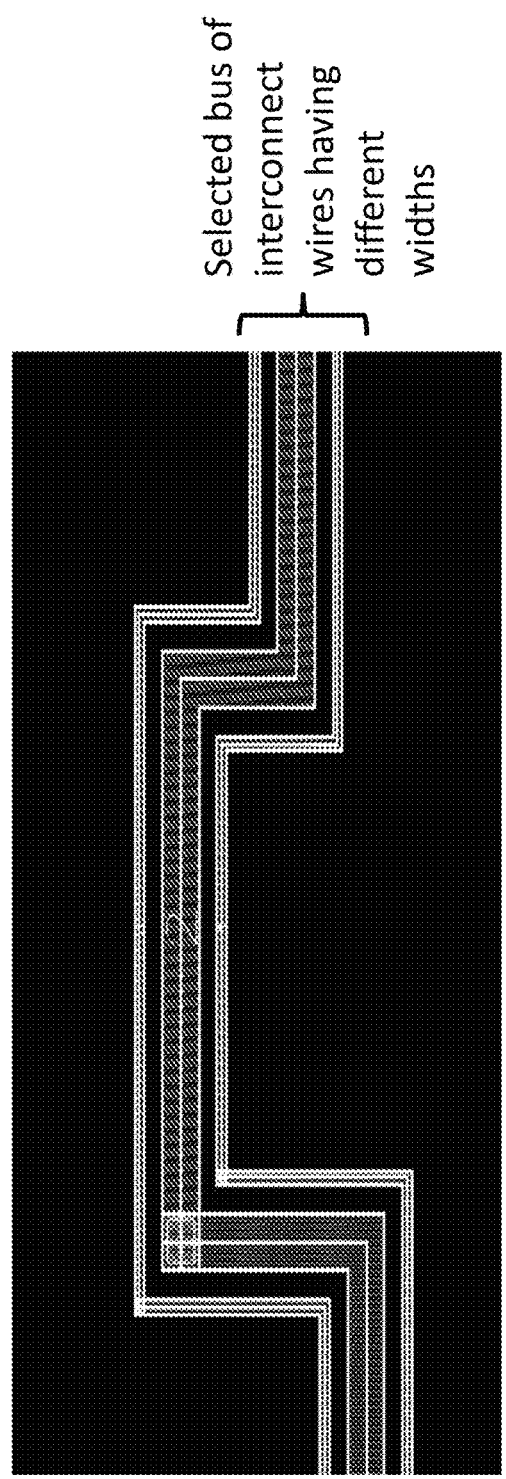
FIG. 5A
FIG. 5B

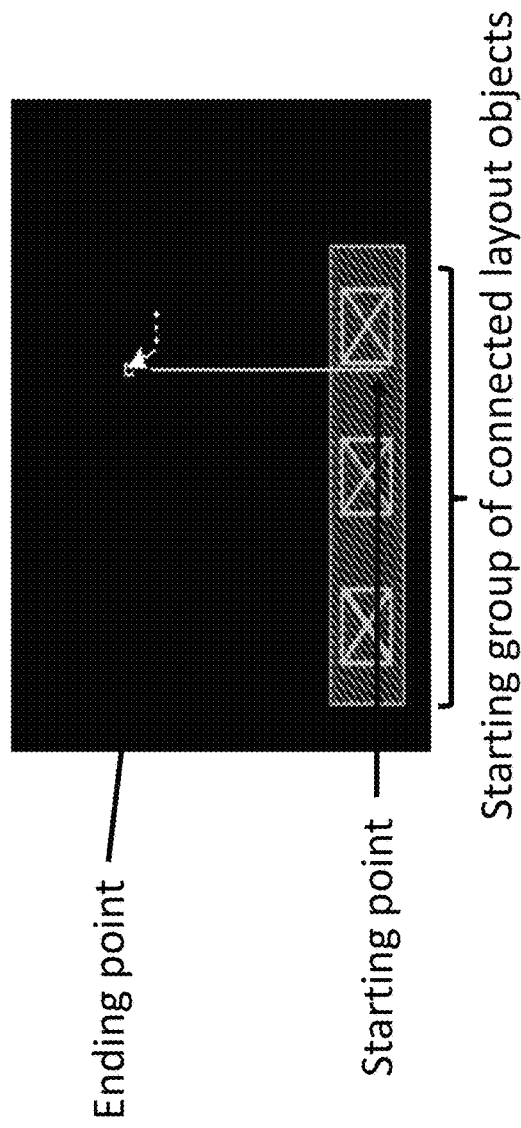
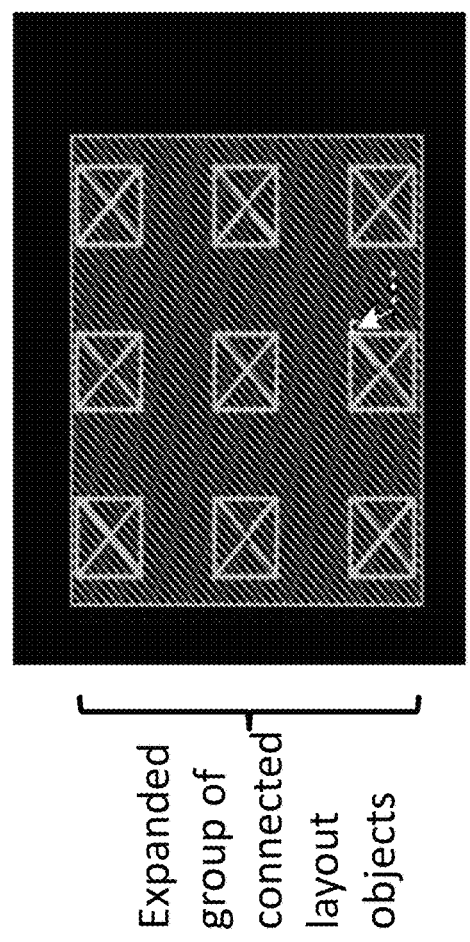
FIG. 6A
FIG. 6B

US 10,372,862 B2

SYSTEMS AND METHODS FOR LAYOUT OBJECTS SELECTION AND REPLICATION VIA A GRAPHIC-BASED LAYOUT EDITOR

BACKGROUND

A graphic-based layout editing tool/editor is software running on a hosting device or host, wherein the graphic-based layout editor presents a layout to a user/designer on a display screen of the host and enables the user to interactively generate and edit the layout via input devices associated with the host. Here, the layout typically includes hundreds or even thousands of layout objects of various shapes and sizes, including but not limited to blocks, cells, gates, interconnect wires, etc. The layout can be, for non-limiting examples, for an integrated circuit (IC) design or an architectural design.

Each layout object in the layout typically has metadata associated with it, wherein such metadata includes, for non-limiting examples, name, geometric properties (e.g., length, width, size, shape or topology, orientation, spacing, and connections with other layout objects of the layout) and design rules (e.g., permissible positions, minimum or maximum lengths, widths, and spacing from other layout objects) each layout object needs to follow in the layout. Quite often, one or more layout objects, which for non-limiting examples, can be a bus comprising one or more interconnect wires and/or a set of one or more vias connecting the wires in an IC layout, need to be replicated to create a new expanded group of layout objects having the same or similar shape/topology in the layout. It would be cumbersome, however, to replicate the layout objects one individual layout object at a time following a certain set of design rules, especially when the number of the layout objects in need of replication is large. It is thus desirable to have a graphic-based layout editor that can enable the user to select and can automatically replicate a starting group of one or more layout objects to create an expanded group of layout objects having the same or similar properties in the layout simultaneously.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A depicts an example of a directional and continuous cursor movement along a single line from a starting point to an ending point in a layout to select a via in an IC layout for replication in accordance with some embodiments.

FIG. 4B depicts an example of an expanded group of vias with new vias replicated and added in the direction of the single line as shown in the example of FIG. 4A together with the metal segment connecting the expanded group of vias in accordance with some embodiments.

FIG. 5A depicts an example of a directional and continuous cursor movement along a single line that intersects with a bus comprising three interconnect wires having the same topology but different wire widths in accordance with some embodiments.

FIG. 5B depicts the example of the selected bus by the directed single line of FIG. 5A in accordance with some embodiments.

FIG. 6A depicts an example of selection of a starting group of connected layout objects including three vias and an interconnect wire segment connecting them in accordance with some embodiments.

FIG. 6B depicts an example of an expanded group of connected layout objects formed by replicating the starting group of the connected layout objects in the direction of the single line of cursor movement as depicted in FIG. 6A in accordance with some embodiments.

DETAILED DESCRIPTION OF EMBODIMENTS

Figure 1:
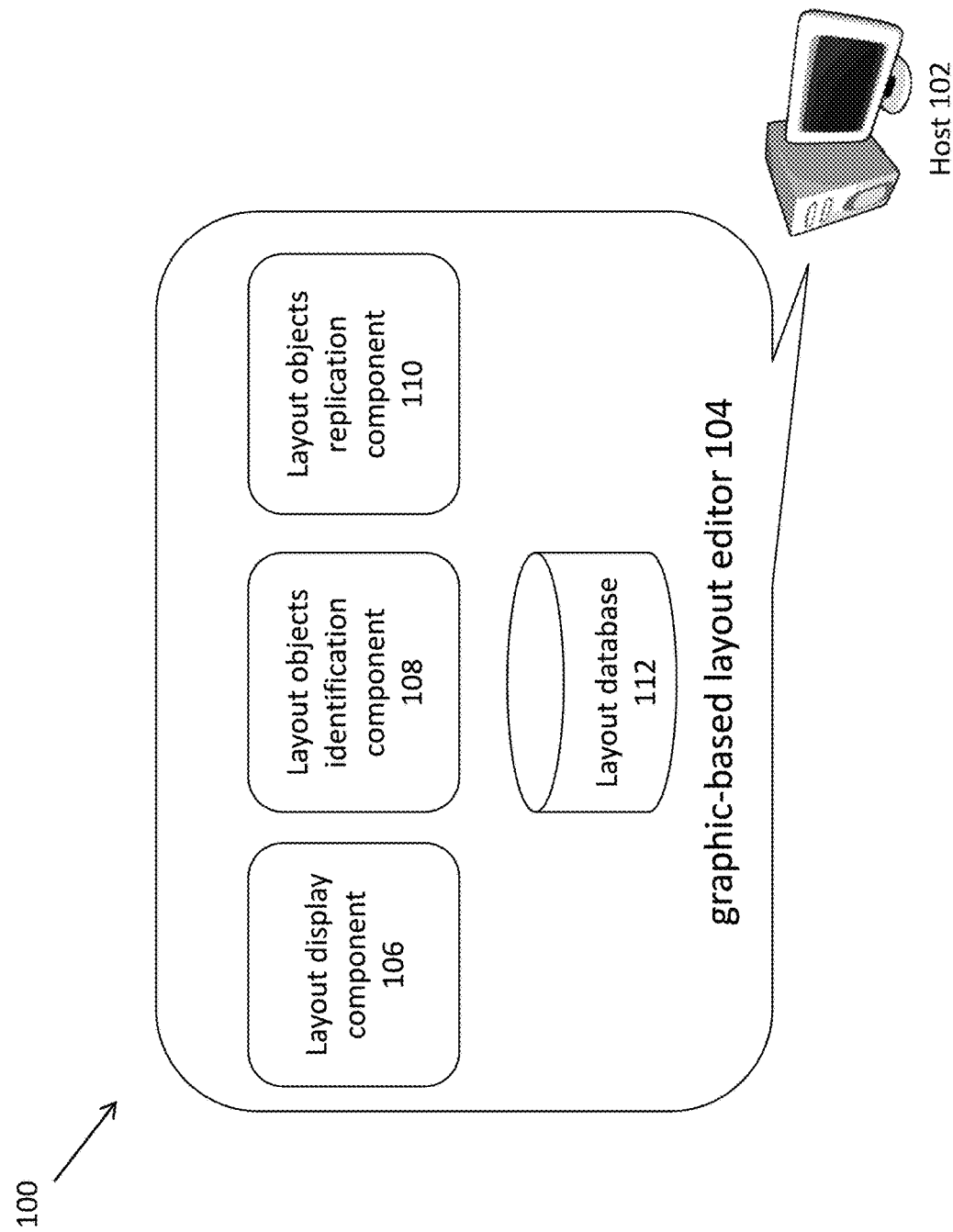
FIG. 1 depicts an example of a diagram of a system to support layout objects selection and replication in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support layout objects selection and replication via a graphic-based layout editing tool running on a host. Specifically, the graphic-based layout editing tool presents a plurality of layout objects in a layout on a display of the host and enables a user to directionally and continuously move a cursor across the layout along a single line from a starting point to an ending point, wherein the single line intersects with and selects a starting group of one or more layout objects. The graphic-based layout editing tool then retrieves metadata and/or design rules associated with the starting group selected layout objects and creates an expanded group of layout objects by replicating and including one or more of the layout objects in the starting group selected layout objects. The graphic-based layout editing tool then presents the expanded group of layout objects on the display following the layout objects replication operation.

By allowing the user to move the cursor continuously across the layout in the directed single line for layout object(s) selection, the proposed graphic-based layout editing tool enables the user to select the starting group of layout objects in the layout and replicate one or more of the layout objects in the direction of the single line simultaneously instead of replicating the layout objects one by one based on the metadata and/or design rules associated with the layout objects. As such, the proposed graphic-based layout editing tool enables the user to expand the group of selected layout objects that share the same or similar properties (e.g., shape or topologies) in one single operation, which greatly improves the efficiency of layout objects replication.

FIG. 1 depicts an example of a diagram of a system 100 to support layout objects selection and replication. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, wherein the multiple hosts can be connected by one or more networks.

In the example of FIG. 1, the system 100 includes a graphic-based layout editor/editing tool/editing software 104, wherein the graphic-based layout editor 104 includes at least a layout display component 106, a layout objects identification component 108, a layout objects replication component 110, and a layout database 112. Here, the graphic-based layout editor 104 runs on a computing unit/appliance/host 102 having a display, one or more processors, storage units, network interfaces and having software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the computing unit, which becomes a special purposed one for practicing the processes. The processes may also be at least partially embodied in the host into which computer program code is loaded and/or executed, such that, the host becomes a special purpose computing unit for practicing the processes. Here, the host can be a computing device, a communication device, a storage device, or any computing device capable of running a software component. For non-limiting examples, a computing device can be, but is not limited to, a laptop PC, a desktop PC, a tablet PC, or an x86 or ARM-based server running Linux or other operating systems. In some embodiments, the host has a communication interface (not shown), which enables the components and/or the database running on the host to communicate with software running on other host over one or more communication networks (not shown) following certain communication protocols, such as TCP/IP, http, https, ftp, and sftp protocols. The communication networks can be, but are not limited to, internet, intranet, wide area network (WAN), local area network (LAN), wireless network, Bluetooth, WiFi, and mobile communication network. The physical connections of the network and the communication protocols are well known to those of skill in the art.

Figure 2:
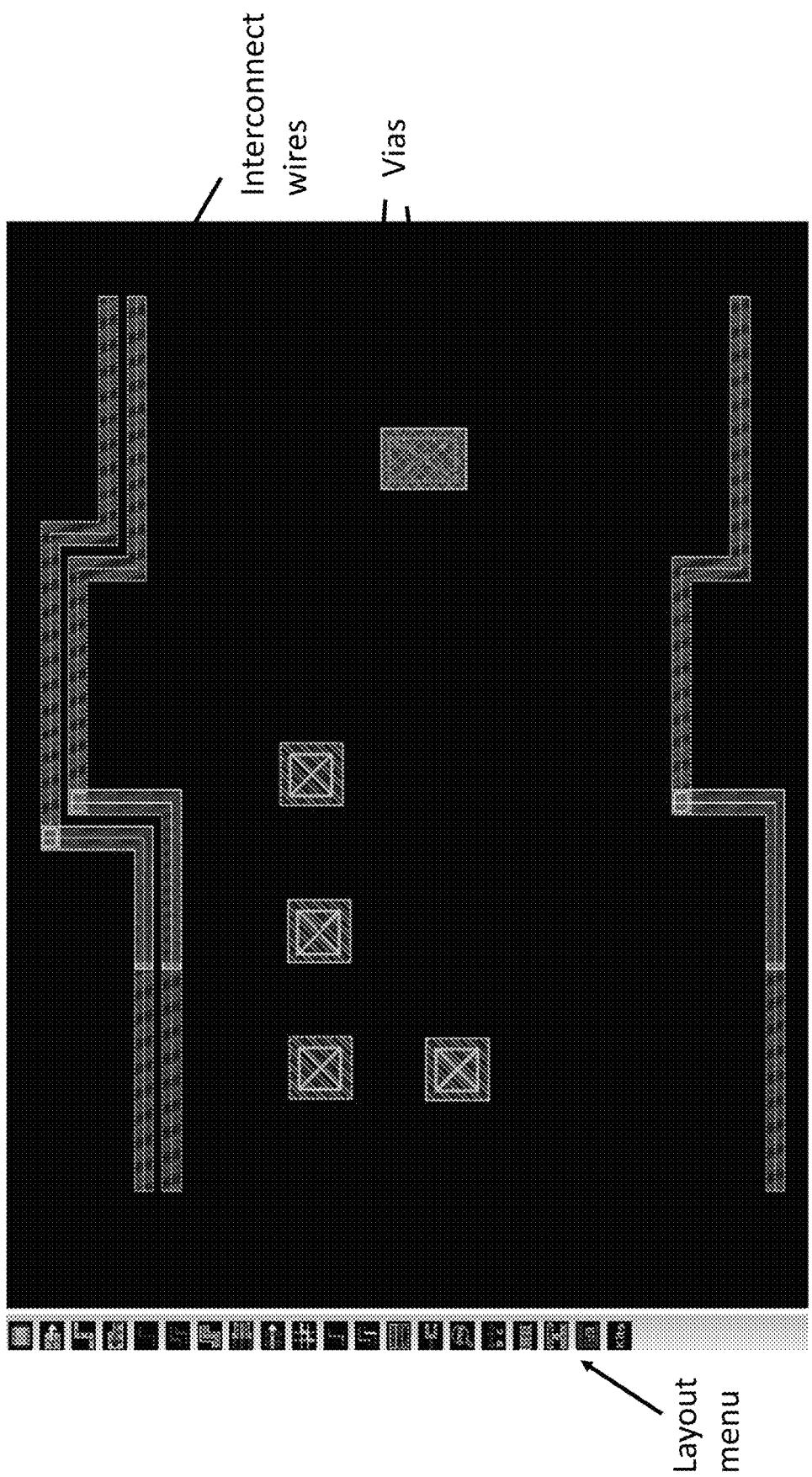
FIG. 2 depicts a non-limiting example of an IC layout having a plurality of interconnect wires each having multiple segments and vias used to connect the interconnect wires as shown on a display of a host in accordance with some embodiments.

In the example of FIG. 1, the layout display component 106 of the graphic-based layout editor 104 is configured to retrieve a layout having a plurality of layout objects from the layout database 112 and present the layout on a display device of the host of the graphic-based layout editor 104 for a user to view and edit interactively. Here, the layout database 112 is configured to maintain metadata and/or design rules associated with each of the layout objects in the layout as well as other related information of the layout. Each of the layout objects is of certain geometric shape/topology and size, which, for non-limiting examples, can be a rectangle, a circle, a polygon, etc. In the non-limiting example of an IC layout having multiple layers, the layout objects can be cells, gates, interconnect wires, and vias of different material types (e.g., metal and polysilicon) on one or more layers and can be presented accordingly by the layout display component 106. FIG. 2 depicts a non-limiting example of an IC layout having a plurality of interconnect wires each having multiple segments and vias used to connect the interconnect wires shown by the layout display component 106 on a display of a host. FIG. 2 also depicts a menu of layout operations presented by the layout display component 106 to the user, who may selectively perform one or more operations on the presented layout objects via the menu of layout operations.

In some embodiments, each of the layout objects may have metadata associated with it, wherein the metadata includes, for non-limiting examples, one or more of name, identifier, and geometric (e.g., length, width, size, shape or topology, orientation, spacing, and connections with other layout objects) of the layout. In the case of an IC design layout object, the layout object may further include various design rules required for the layout object, wherein such design rules may include, for non-limiting examples, one or more of minimum and/or maximum width and/or length of the layout object, minimum and/or maximum spacing between the layout object and its adjacent layout objects, and a specific layer the layout object needs to be placed. In some embodiments, the design rules are pre-defined for the layout object based on its properties. In some embodiments, the design rules can be dynamically adjusted by the user via the graphic-based layout editor 104 during editing of the layout.

Figure 3A:
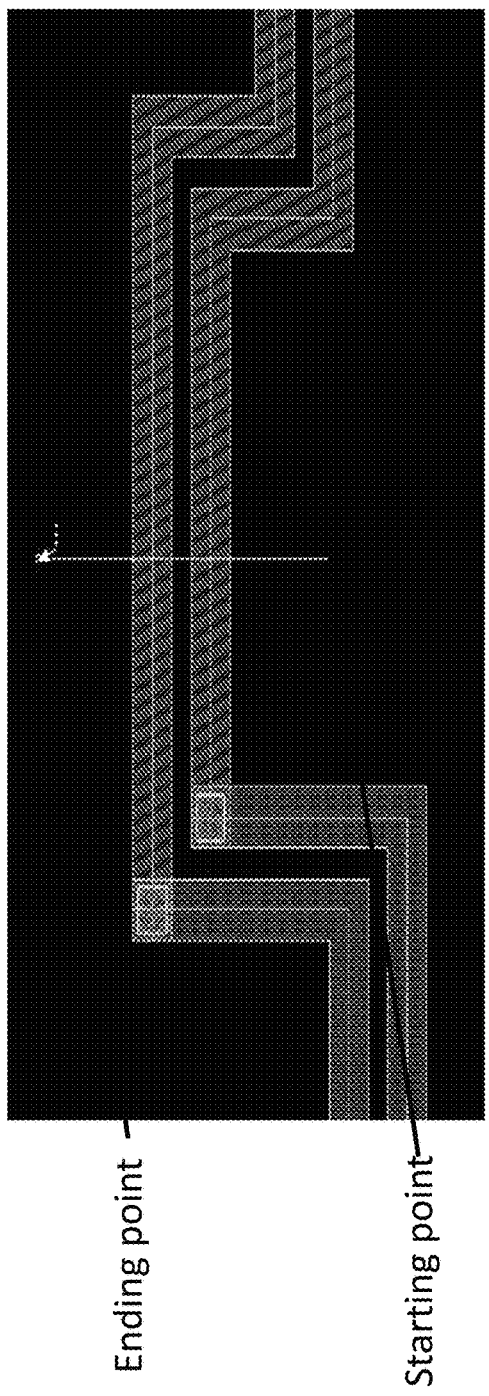
FIG. 3A depicts an example of a directional and continuous cursor movement along a single line from a starting point to an ending point in a layout, wherein the single line intersects with a bus comprising two interconnect wires in accordance with some embodiments.
Figure 3B:
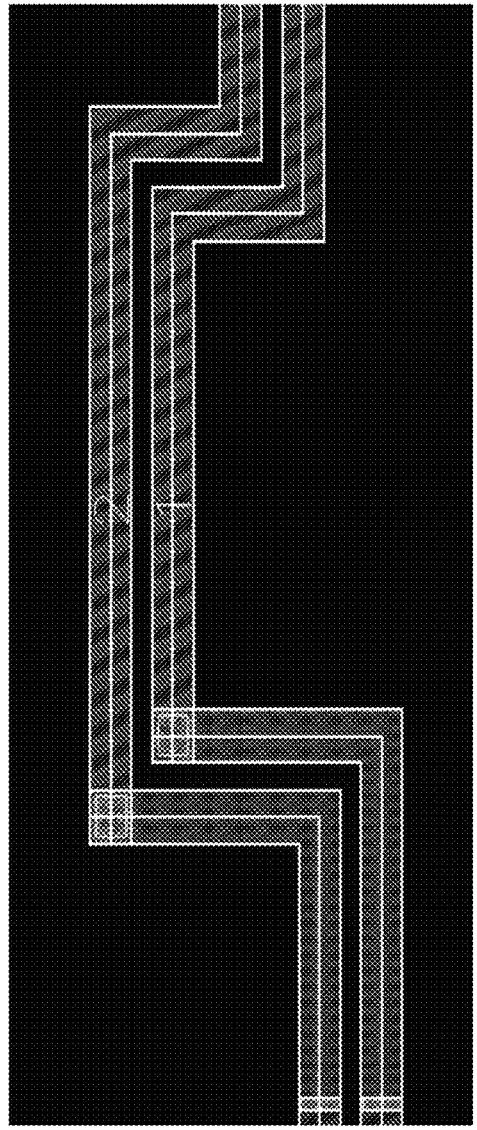
FIG. 3B depicts the example of the selected bus by the directed single line of FIG. 3A in accordance with some embodiments.

In the example of FIG. 1, the layout objects identification component 108 of the graphic-based layout editor 104 is configured to recognize a directional and continuous cursor movement by a user along a single line from a starting point to an ending point in the layout, wherein the single line intersects with a starting group of layout objects among the plurality of layout objects in the layout. Here, the user may initiate and perform the cursor movement via an input device (e.g., a mouse) of the host or by moving his/her finger across a touch screen of the host. The single line of directional continuous cursor movement from the starting point to the ending point across the layout can be in the form of one of a directed straight line, a directed curved line, or a directed line following a path of cursor movement across the layout. FIG. 3A depicts an example of a directional and continuous cursor movement along a directed single line by the user from a starting point to an ending point in a layout to select a bus (group) comprising two interconnect wires as shown in FIG. 3B. FIG. 4A depicts an example of a directional and continuous cursor movement along a directed single line from a starting point to an ending point in a layout to select a via in an IC layout for replication.

In some embodiments, the layout objects identification component 108 is configured to identify a starting group of layout objects intersected by a directional single line, wherein the starting group of layout objects shares at least some of their geometric properties. For a non-limiting example, a directional and continuous cursor movement along a single line shown in FIG. 5A may select a bus comprising three interconnect wires having the same topology but different wire widths (e.g., the one in the middle of the bus having wider width than the two on two sides of the bus) as shown in FIG. 5B.

Figure 3C:
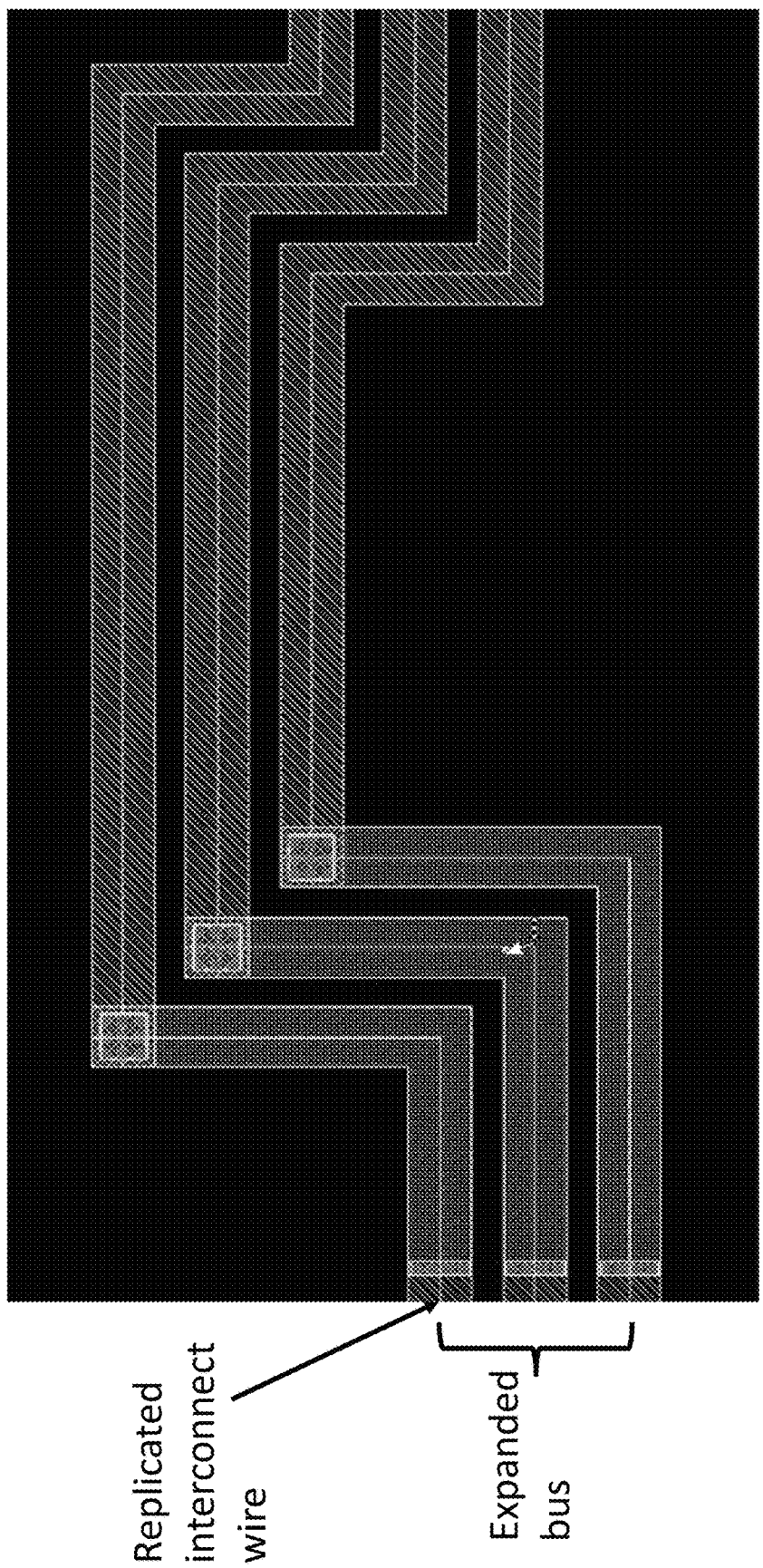
FIG. 3C depicts an example of an expanded bus of interconnect wires with a new interconnect wire replicated and added in the direction of the single line as shown in the example of FIG. 3A to the selected bus depicted in FIG. 3B in accordance with some embodiments.

Once the starting group of layout objects has been selected via the directional and continuous cursor movement, the layout objects replication component 110 of the graphic-based layout editor 104 is configured to retrieve metadata and/or one or more design rules associated with the group of selected layout objects from the layout database 112. The layout objects replication component 110 is then configured to perform a replication operation to replicate one or more of the selected layout objects simultaneously along the direction of the continuous cursor movement to form an expanded group of layout objects based on the retrieved metadata and/or design rules associated with the selected layout objects. Here, the replicated layout objects follow the same topology as the layout objects in the starting group of layout objects. The number of layout objects to be replicated and/or certain geometric properties (e.g., width, size, shape or topology) of each of the related layout objects as well as spacing or relative positioning among the layout objects can be specified by the user via the graphic-based layout editor 104. FIG. 3C depicts an example of an expanded bus of interconnect wires with a new interconnect wire replicated and added in the direction of the single line as shown in the example of FIG. 3A to the starting group of interconnect wires shown in the example depicted in FIG. 3B. FIG. 4B depicts an example of an expanded group of vias with new vias replicated and added in the direction of the single line as shown in the example of FIG. 4A together with the metal segment connecting the expanded group of vias.

Figure 5C:
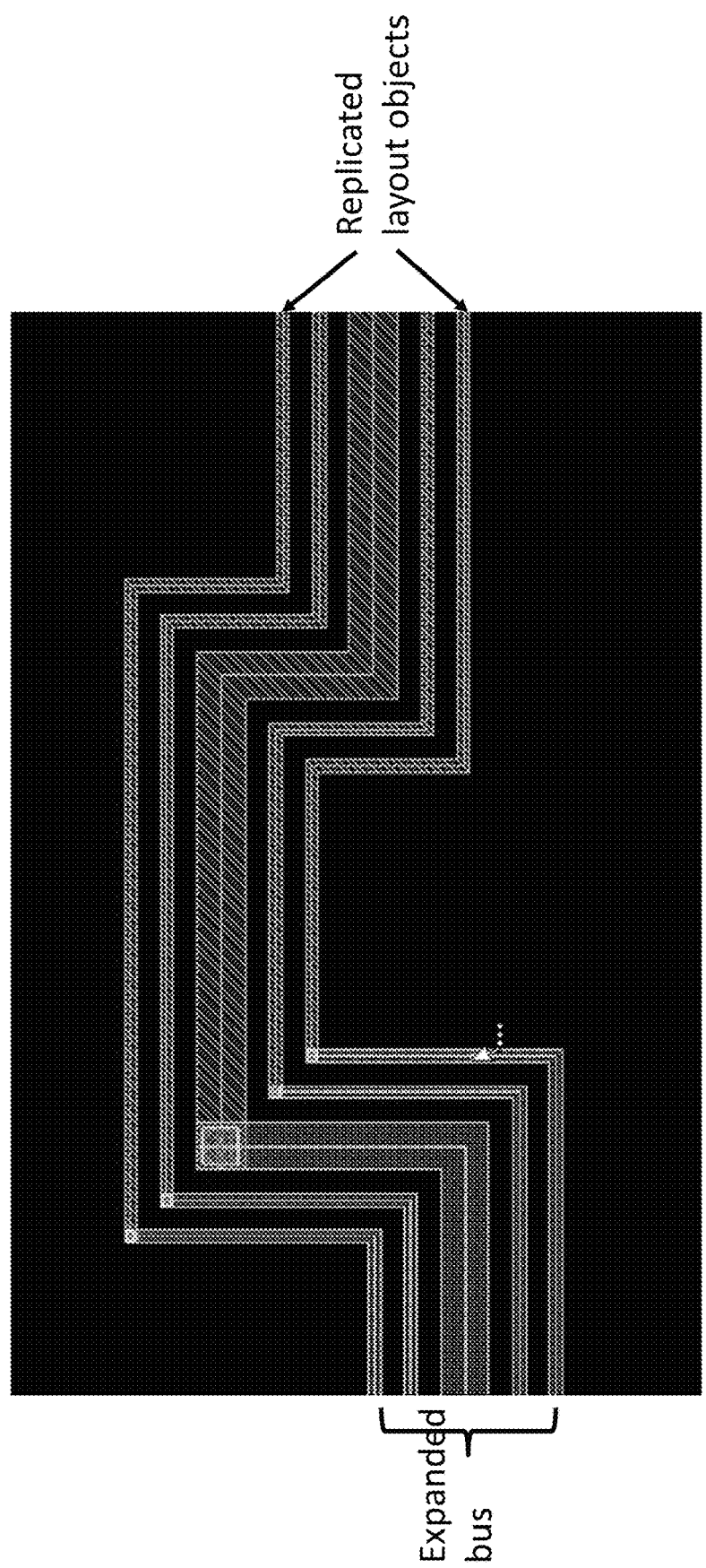
FIG. 5C depicts an example of an expanded bus of interconnect wires, wherein two interconnected wires are replicated and added to each side of the starting group of the selected bus depicted in FIG. 5B in accordance with some embodiments.

In some embodiments, instead of replicating the layout object(s) in the direction of the single line intersecting and selecting the starting group of layout objects, the layout objects replication component 110 is configured to replicate one or more of the selected layout objects on various different sides of the starting group of the selected layout object to create the expanded group of layout objects based on the retrieved metadata and/or user-specified properties associated with the layout objects. FIG. 5C depicts an example of an expanded bus of interconnect wires, wherein two interconnected wires are replicated and added to each side of the of starting group of the selected bus of interconnect wires depicted in FIG. 5B to serve as shields to the bus in the case of an IC layout. As shown by the example of FIG. 5C, the replicated interconnect wires may share the same widths as their adjacent interconnect wires in the bus or they may have their widths as specified by the user or as required by their design rules.

In some embodiments, the layout objects identification component 108 is configured to identify a starting group of connected layout objects by recognizing a directional and continuous cursor movement by a user along a directed single line that intersects with at least one, not necessarily all, of the starting group of connected layout objects. The layout objects replication component 110 is then configured to replicate the starting group of connected layout objects as a whole to create an expanded group of connected layout objects along the direction of the directed single line following the metadata and design rules of the connected layout objects. FIG. 6A depicts an example of selection of a starting group of connected layout objects including three vias and an interconnect wire segment connecting them that has been selected by a directed single line of cursor movement that intersects with one (e.g., the connecting wire segment) of the starting group of the connected layout objects. Here, the directed single line of cursor movement starts within the starting group of the connected layout objects and ends in an open area of the layout for the expanding operation. FIG. 6B depicts an example of an expanded group of connected layout objects formed by replicating the starting group of the connected layout objects in the direction of the single line of cursor movement as depicted in FIG. 6A.

Figure 6C:
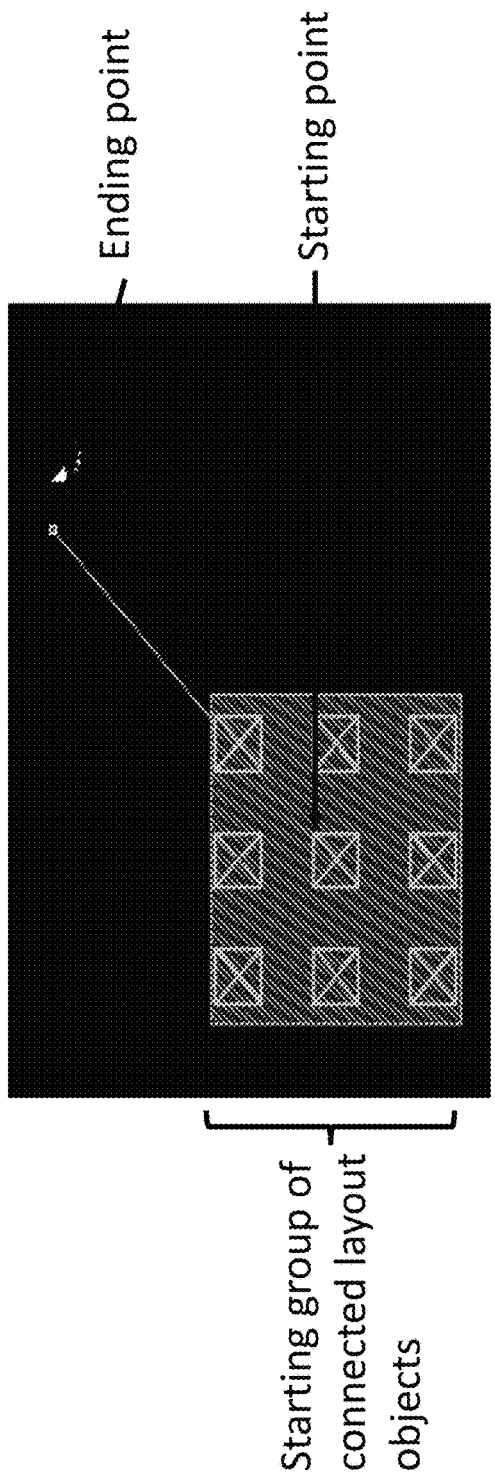
FIG. 6C depicts an example of selection of a starting group of connected layout objects as shown by FIG. 6B by a diagonally-directed single line of cursor movement in accordance with some embodiments.
Figure 6D:
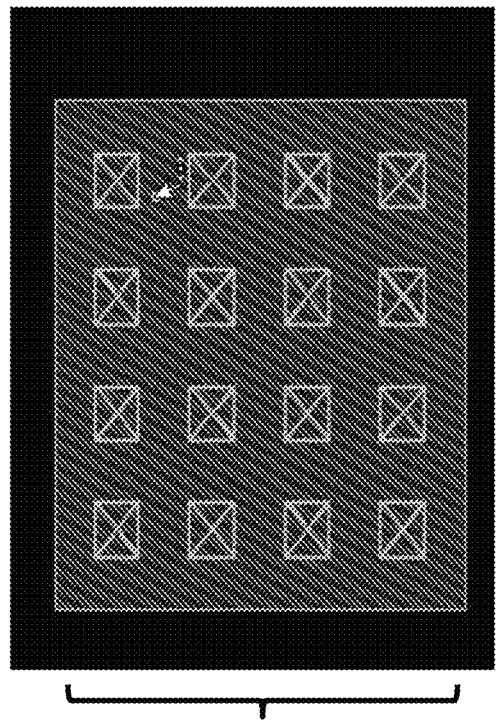
FIG. 6D depicts an example of expanding the group of connected layout objects depicted in FIG. 6C in the diagonal direction of the single line of cursor movement in accordance with some embodiments.

In some embodiments, instead of expanding the starting group of layout objects in a single dimension (horizontal or vertical), the layout objects replication component 110 is configured to replicate and expand a group of connected layout objects in multiple dimensions (both horizontally and vertically) at the same time along the direction of the single line of cursor movement. FIG. 6C depicts an example of selection of a starting group of connected layout objects as shown by FIG. 6B by a diagonally-directed single line of cursor movement that intersects with certain objects (e.g., two vias and the connect wire piece) of the starting group of the connected layout objects. FIG. 6D depicts an example of expanding the group of connected layout objects depicted in FIG. 6C in the diagonal direction of the single line of cursor movement, wherein vias and their connecting wire segment are replicated both horizontally and vertically.

Figure 6E:
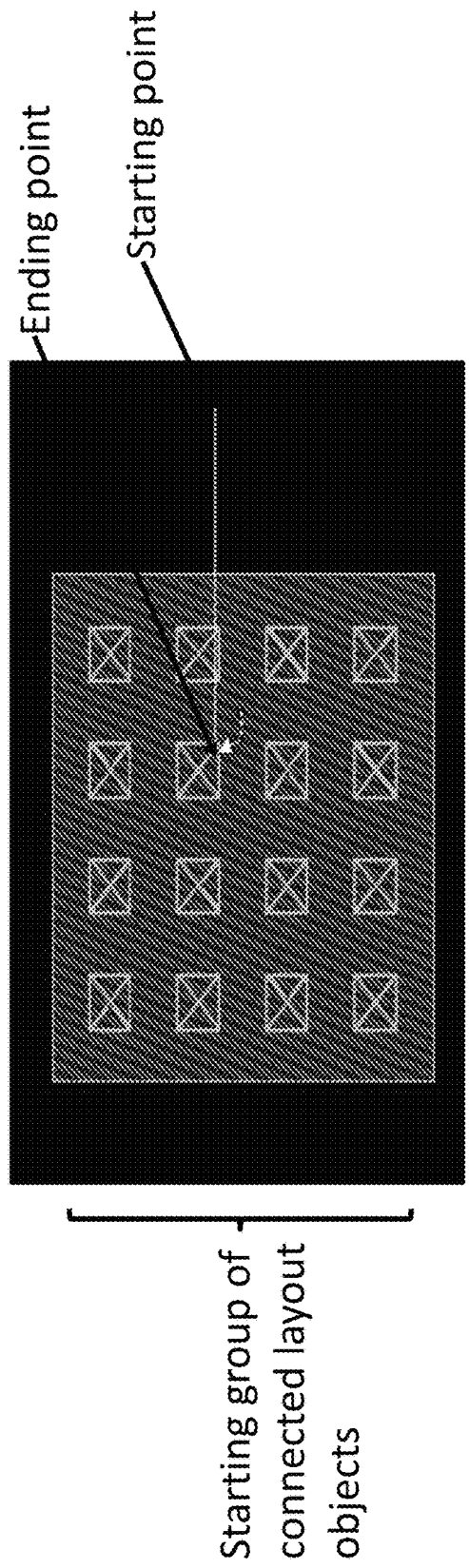
FIG. 6E depicts an example of a starting group of connected layout objects as shown by FIG. 6D by a single line of cursor movement that intersects with certain objects of the starting group of the connected layout objects in accordance with some embodiments.
Figure 6F:
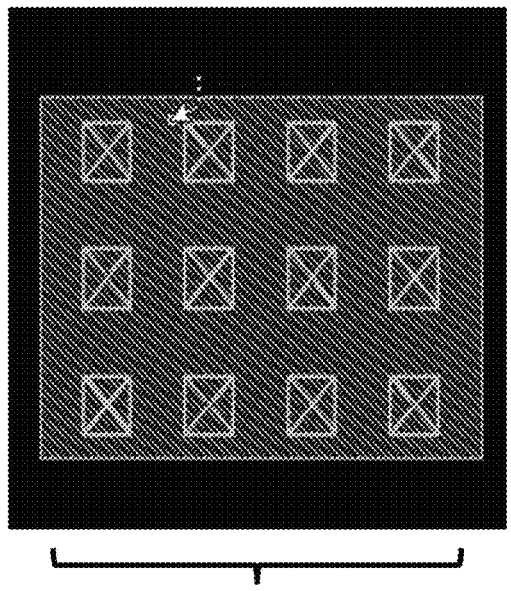
FIG. 6F depicts an example of a contracted group of connected layout objects formed by removing certain layout objects from the starting group of the connected layout objects depicted in FIG. 6E in the direction of the single line of cursor movement in accordance with some embodiments.

In some embodiments, the layout objects replication component 110 is configured to shrink, instead of expand, the starting group of selected layout objects by removing certain layout objects from the starting group of layout objects to create a contracted group of layout objects along the direction of the directed single line of cursor movement that intersects and selects the starting group of layout objects. Here, instead of starting within the starting group of layout objects and ending in an open area of the layout in the case of replicating and expanding the starting group of layout objects, the directed single line of cursor movement starts in an open area of the layout and ends in the starting group of layout objects for the shrinking operation. FIG. 6E depicts an example of a starting group of connected layout objects as shown by FIG. 6D by a single line of cursor movement that intersects with certain objects (e.g., two vias and the connect wire piece) of the starting group of the connected layout objects, wherein the single line of cursor movement starts in an open area of the layout and ends in the starting group of selected layout objects. FIG. 6F depicts an example of a contracted group of connected layout objects formed by removing certain layout objects from the starting group of the connected layout objects depicted in FIG. 6E in the direction of the single line of cursor movement.

Once the layout object replication operation on the group of selected layout objects is completed, the layout display component 106 is configured to present the layout including the expanded or contracted group of layout objects on the display, update the metadata (e.g., width, size, spacing, topology, location, and/or connections) of each of the layout objects in the expanded group, and save the layout objects to the layout database 112 together with their updated metadata.

Figure 7:
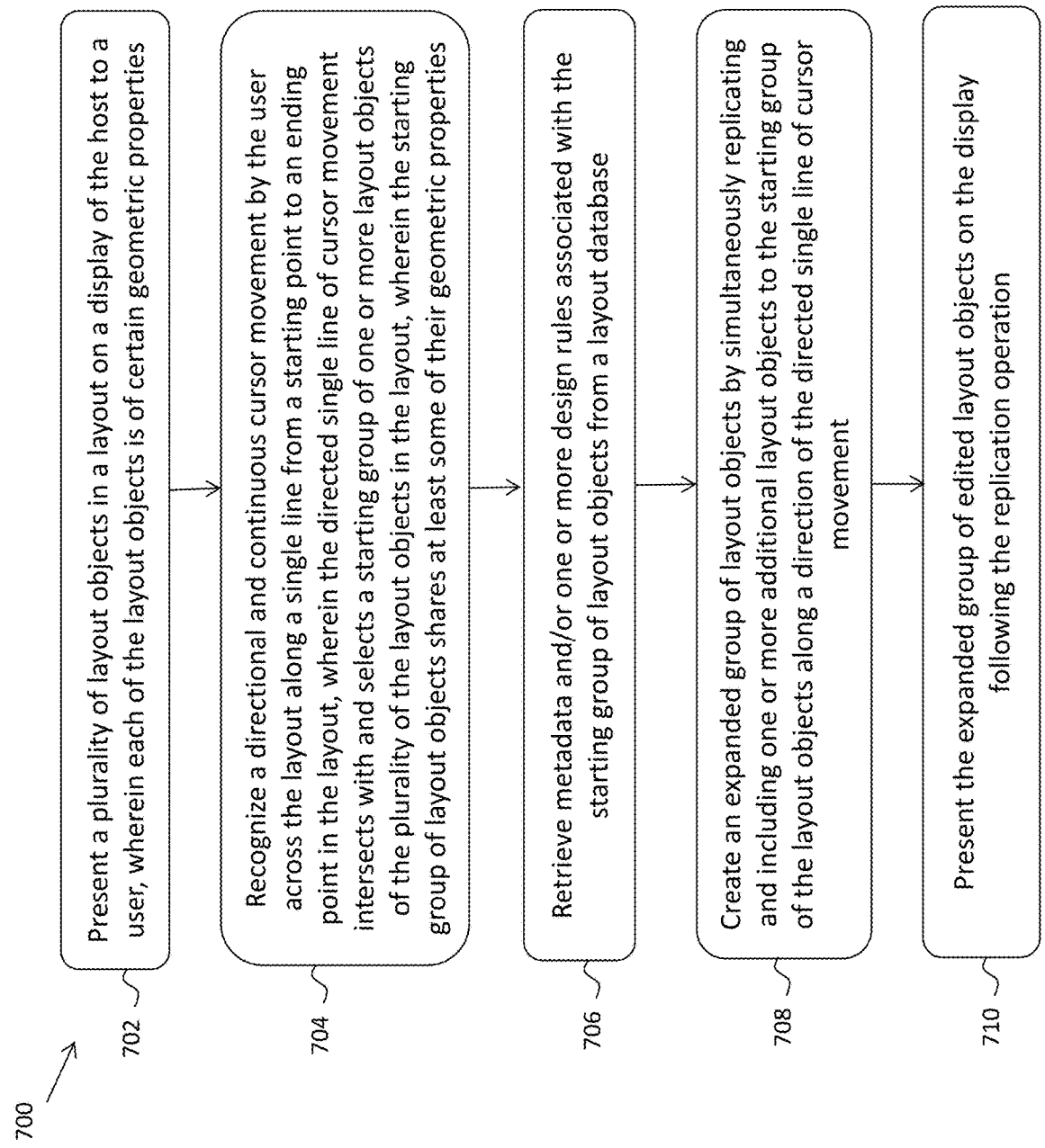
FIG. 7 depicts an example of a flowchart of a process to support layout objects selection and replication in accordance with some embodiments.

FIG. 7 depicts an example of a flowchart of a process to support layout objects selection and replication. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 7, the flowchart 700 starts at block 702, where a plurality of layout objects in a layout is presented on a display of the host to a user, wherein each of the layout objects is of certain geometric properties. The flowchart 700 continues to block 704, where a directional and continuous cursor movement by the user across the layout along a single line from a starting point to an ending point in the layout is recognized, wherein the directed single line of cursor movement intersects with and selects a starting group of one or more layout objects of the plurality of the layout objects in the layout, wherein the starting group of layout objects shares at least some of their geometric properties. The flowchart 700 continues to block 706, where metadata and/or one or more design rules associated with the starting group of layout objects are retrieved from a layout database. The flowchart 700 continues to block 708, where an expanded group of layout objects is created by simultaneously replicating and including one or more additional layout objects to the starting group of the layout objects along a direction of the directed single line of cursor movement. The flowchart 700 ends at block 710, where the expanded group of edited layout objects is presented on the display following the replication operation.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVDs, CD-ROMs, micro drives, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments, and the various modifications that are suited to the particular use contemplated.

What is claimed is:

1. A system to support layout objects selection and replication, comprising:
a graphic-based layout editing tool running on a host, which in operation, is configured to
present a plurality of layout objects in a layout on a display of the host to a user, wherein each of the layout objects is of certain geometric properties;
recognize a directional and continuous cursor movement by the user across the layout along a single line from a starting point to an ending point in the layout, wherein the directed single line of cursor movement intersects with a starting group of one or more layout objects of the plurality of the layout objects in the layout, wherein the directed single line of cursor movement selects the starting group of the one or more layout objects, and wherein the starting group of layout objects shares at least some of their geometric properties;
retrieve metadata and/or one or more design rules associated with the starting group of layout objects from a layout database;
create an expanded group of layout objects by simultaneously replicating and including one or more additional layout objects to the starting group of the layout objects along a direction of the directed single line of cursor movement;
remove certain layout objects from the starting group of layout objects to create a contracted group of layout objects along the direction of the directed single line of cursor movement;
present the expanded group of edited layout objects on the display following the replication operation; and
update the metadata in response to the creating and removing.

2. The system of claim 1, further comprising:
said layout database configured to maintain metadata and/or design rules associated with each of the layout objects in the layout.

3. The system of claim 1, wherein:
the metadata of each layout object includes one or more of name, identifier, and geometric properties of the layout object as well as its connections to other layout objects, wherein the geometric properties include width, size, and topology of the layout object.

4. The system of claim 1, wherein:
the design rules include one or more of minimum and/or maximum width and/or length of the layout object, minimum and/or maximum spacing between the layout object and its adjacent layout objects, and a specific layer the layout object needs to be placed.

5. The system of claim 1, wherein:
the directed single line of cursor movement is one of a directed straight line, a directed curved line, or a directed line following a path of cursor movement across the layout.

6. The system of claim 1, wherein:
the replicated layout objects follow the same topology as the layout objects in the starting group of layout objects.

7. The system of claim 1, wherein:
the graphic-based layout editing tool is configured to replicate one or more of the selected layout objects on different sides of the starting group of the selected layout object to create the expanded group of layout objects instead of replicating the layout objects in the direction of the directed single line of cursor movement.

8. The system of claim 1, wherein:
the graphic-based layout editing tool is configured to
 identify a starting group of connected layout objects by recognizing the directional and continuous cursor movement by the user along the directed single line that intersects with at least one, of the starting group of connected layout objects, wherein the directed single line of cursor movement starts within the starting group of connected layout objects and ends in an open area of the layout;
 replicate the starting group of connected layout objects as a whole to create an expanded group of connected layout objects along the direction of the directed single line of cursor movement.

9. The system of claim 8, wherein:
the graphic-based layout editing tool is configured to replicate and expand the group of connected layout objects in multiple dimensions at the same time along the direction of the directed single line of cursor movement.

10. The system of claim 1, wherein:
the directed single line of cursor movement starts in an open area of the layout and ends in the starting group of layout objects for the shrinking operation.

11. A computer-implemented method to support layout objects selection and replication, comprising:
 presenting a plurality of layout objects in a layout on a display of the host to a user, wherein each of the layout objects is of certain geometric properties;
 recognizing a directional and continuous cursor movement by the user across the layout along a single line from a starting point to an ending point in the layout, wherein the directed single line of cursor movement intersects with a starting group of one or more layout objects of the plurality of the layout objects in the layout, wherein the directed single line of cursor movement selects the starting group of the one or more layout objects, and wherein the starting group of layout objects share at least some of their geometric properties;
 retrieving metadata and/or one or more design rules associated with the starting group of layout objects from a layout database;
 creating an expanded group of layout objects by simultaneously replicating and including one or more additional layout objects to the starting group of the layout objects along a direction of the directed single line of cursor movement;
 removing certain layout objects from the starting group of layout objects to create a contracted group of layout objects along the direction of the directed single line of cursor movement;
 presenting the expanded group of edited layout objects on the display following the replication operation; and
 updating the metadata in response to the creating and removing.

12. The computer-implemented method of claim 11, further comprising:
 maintaining metadata and/or design rules associated with each of the layout objects in the layout in said layout database, wherein the metadata of each layout object includes one or more of name, identifier, geometric properties of the layout object as well as its connections to other layout objects, and the design rules include one or more of minimum and/or maximum width and/or length of the layout object, minimum and/or maximum spacing between the layout object and its adjacent layout objects, and a specific layer the layout object needs to be placed.

13. The computer-implemented method of claim 11, wherein:
the directed single line of cursor movement is one of a directed straight line, a directed curved line, or a directed line following a path of movement across the layout.

14. The computer-implemented method of claim 11, wherein:
the replicated layout objects follow the same topology as the layout objects in the starting group of layout objects.

15. The computer-implemented method of claim 11, further comprising:
 replicating one or more of the selected layout objects on different sides of the starting group of the selected layout object to create the expanded group of layout objects instead of replicating the layout objects in the direction of the directed single line of cursor movement.

16. The computer-implemented method of claim 11, further comprising:
 identifying a starting group of connected layout objects by recognizing the directional and continuous cursor movement by the user along the directed single line that intersects with at least one, of the starting group of connected layout objects, wherein the directed single line of cursor movement starts within the starting group of connected layout objects and ends in an open area of the layout;

replicating the starting group of connected layout objects as a whole to create an expanded group of connected layout objects along the direction of the directed single line of cursor movement.

17. The computer-implemented method of claim 11, further comprising:
replicating and expanding the group of connected layout objects in multiple dimensions at the same time along the direction of the directed single line of cursor movement.

18. A non-transitory computer readable storage medium having software instructions stored thereon that when executed cause a system to:
present a plurality of layout objects in a layout on a display of the host to a user, wherein each of the layout objects is of certain geometric properties;
recognize a directional and continuous cursor movement by the user across the layout along a single line from a starting point to an ending point in the layout, wherein the directed single line of cursor movement intersects with a starting group of one or more layout objects of the plurality of the layout objects in the layout, wherein the directed single line of cursor movement selects the starting group of the one or more layout objects, and wherein the starting group of layout objects share at least some of their geometric properties;
retrieve metadata and/or one or more design rules associated with the starting group of layout objects from a layout database;
create an expanded group of layout objects by simultaneously replicating and including one or more additional layout objects to the starting group of the layout objects along a direction of the directed single line of cursor movement;
remove certain layout objects from the starting group of layout objects to create a contracted group of layout objects along the direction of the directed single line of cursor movement;
present the expanded group of edited layout objects on the display following the replication operation; and
update the metadata in response to the creating and removing.

* * * * *